US012582224B2

(12) United States Patent

Subhash et al.

(10) Patent No.: US 12,582,224 B2

(45) Date of Patent: Mar. 24, 2026

(54) DETERMINING A PRESSURE ASSOCIATED WITH AN ORAL CARE DEVICE, AND METHODS THEREOF

(71) Applicant: Colgate-Palmolive Company, New York, NY (US)

(72) Inventors: Hrebesh Molly Subhash, Somerset, NJ (US); Benny E. Urban, Jr., Westfield, NJ (US)

(73) Assignee: Colgate-Palmolive Company, New York, NY (US)

( * ) Notice: Subject to any disclaimer, the term of this patent is extended or adjusted under 35 U.S.C. 154(b) by 492 days.

(21) Appl. No.: 17/948,649

(22) Filed: Sep. 20, 2022

(65) Prior Publication Data

US 2023/0088940 A1 Mar. 23, 2023

Related U.S. Application Data

(60) Provisional application No. 63/247,377, filed on Sep. 23, 2021.

(51) Int. Cl.
| | |
|---|---|
| *A46B 15/00* | (2006.01) |
| *A46B 9/04* | (2006.01) |

(Continued)

(52) U.S. Cl.
CPC ............ *A46B 15/0012* (2013.01); *A46B 9/04* (2013.01); *A46B 13/02* (2013.01);

(Continued)

(58) Field of Classification Search
CPC ....... G01L 1/10; A61C 17/22; A46B 15/0006; A46B 13/02; A46B 9/04; A46B 15/0012

(Continued)

(56) References Cited

U.S. PATENT DOCUMENTS

| | | | |
|---|---|---|---|
| 5,784,742 A | 7/1998 | Giuliani et al. | |
| 6,397,424 B1 * | 6/2002 | Leung ................ | A46B 15/0044 |
| | | | 15/105 |

(Continued)

FOREIGN PATENT DOCUMENTS

| | | |
|---|---|---|
| CN | 101716099 | 7/2012 |
| CN | 110141387 | 8/2019 |

(Continued)

OTHER PUBLICATIONS

International Search Report and the Written Opinion of the International Searching Authority issued in International Application PCT/US2022/044103 mailed Dec. 14, 2022.

*Primary Examiner* — Katina N. Henson

(57) ABSTRACT

An oral care system including an oral care device and a processor. The oral care device includes a head having cleaning elements and a vibrational sensor configured to determine vibrational data emitted by the oral care device in use. The processor is operably coupled to the vibrational sensor and is configured to: determine, based on the vibrational data, an applied pressure of the cleaning elements upon an oral cavity of a user; determine an optimal pressure associated with the oral cavity of the user and a non-optimal pressure associated with the oral cavity of the user; and based on the applied pressure of the cleaning elements upon the oral cavity being substantially the non-optimal pressure, cause the applied pressure of the cleaning elements upon the oral cavity to be substantially the optimal pressure.

14 Claims, 6 Drawing Sheets

(51) Int. Cl.
    *A46B 13/02*           (2006.01)
    *A61C 17/22*           (2006.01)
    *G01L 1/10*            (2006.01)

(52) U.S. Cl.
    CPC .......... *A46B 15/0006* (2013.01); *A61C 17/22*
          (2013.01); *G01L 1/10* (2013.01)

(58) Field of Classification Search
    USPC ........................................................ 15/22.1
    See application file for complete search history.

(56) References Cited

U.S. PATENT DOCUMENTS

| | | | | |
|---|---|---|---|---|
| 8,272,091 | B2 | 9/2012 | Hwang et al. | |
| 8,341,791 | B2 | 1/2013 | Iwahori | |
| 8,863,343 | B2 | 10/2014 | Iwahori | |
| 9,572,419 | B2 | 2/2017 | Bloch et al. | |
| 9,724,001 | B2 * | 8/2017 | Dykes .................. | A46B 15/001 |
| 10,064,711 | B1 * | 9/2018 | Richter ................ | A61C 17/221 |
| 11,278,384 | B2 | 3/2022 | Serval et al. | |

| | | | | |
|---|---|---|---|---|
| 2013/0247321 | A1 | 9/2013 | Sichau | |
| 2014/0065588 | A1 * | 3/2014 | Jacobson ............. | A61C 17/225 |
| | | | | 15/22.1 |
| 2016/0278640 | A1 * | 9/2016 | Russell ................ | A61C 19/066 |
| 2019/0038014 | A1 * | 2/2019 | Greer, Jr. .......... | A46B 15/0044 |
| 2020/0268141 | A1 * | 8/2020 | Newman ................ | H04R 1/028 |
| 2021/0056469 | A1 | 2/2021 | Huang et al. | |

FOREIGN PATENT DOCUMENTS

| | | |
|---|---|---|
| CN | 107432775 | 6/2020 |
| CN | 111297506 | 6/2020 |
| CN | 111772848 | 10/2020 |
| CN | 111870377 | 11/2020 |
| CN | 108852546 | 3/2021 |
| CN | 111714240 | 3/2021 |
| CN | 108652772 | 4/2021 |
| CN | 112674898 | 4/2021 |
| DE | 102004022663 | 7/2016 |
| JP | 2008-012232 | 1/2008 |
| WO | WO-2019187495 A1 * | 10/2019 |
| WO | 2021/081560 | 4/2021 |

* cited by examiner

DETERMINING A PRESSURE ASSOCIATED WITH AN ORAL CARE DEVICE, AND METHODS THEREOF

CROSS-REFERENCE TO RELATED APPLICATION

This application claims the benefit of priority from U.S. Provisional Application No. 63/247,377, filed Sep. 23, 2021, the contents of which are hereby incorporated herein by reference in their entirety.

BACKGROUND

Electric toothbrushes have been turned into high tech gear through the incorporation of motion sensors and internal cameras, and through the integration of external cameras, smart phones, and apps, all with the goal of improving the oral care routines of users. The motion sensors can help track the brushing routine, the cameras can acquire images or video of the oral cavity during the routine, and the smart phones can help provide feedback to the user to improve the routine. More recently, technology has been incorporated into toothbrushes in order to identify areas of plaque buildup on the teeth of users and early signs of gum decay, all to either help the user better focus their oral care routine or to enable the user to share the information with their dental professional.

While these advances are incredibly useful, electric tooth-brushes are known to have some unwanted side effects. One particular side effect is tissue damage caused from chronic high pressure brushing. Chronic high pressure brushing can cause damage to both hard and soft tissues. In the case of hard tissues, high pressure brushing gradually wears away enamel that protects the underlying layers of teeth. Enamel erosion can lead to stained teeth and tooth hypersensitivity to things such as temperature and spicy foods. High pressure brushing also can cause the soft tissue to recede from the hard tissues (gum recession). Gum recession can give un-aesthetic appearances, but also lead to more serious health complications such as bacterial gum infection. Bacterial gum infections can cause further degradation of soft tissue and, in some cases, bacteria can infect the bones supporting the teeth. Bacteria in the bones supporting the teeth can permanently compromise structural integrity and lead to tooth loss, along with a need for prosthetic implants or dentures.

Currently, there is an unmet need for an affordable, consumer level electric that automatically adjusts bushing pressure to prevent aggressive and high pressure brushing. Conventional electric brushes can inform the user of high brushing pressures with haptic feedback, visual LEDs, audible warnings, or gauges on a phone application. In addition, the brushes are generally expensive and some pressure features are complex to use. None of the conventional brushes offer real-time adjustment of the motor to maintain an ideal pressure for preserving tissue integrity with little to no user burden. This leaves a need for a consumer level electric brush that can automatically detect and adjust pressure for the user in real-time. Therefore, what is desired is an electric toothbrush that can detect pressure being applied to portions within the oral cavity of a user, such as the gums of the user. What is further desired is an electric toothbrush that can adjust the pressure applied by the electric toothbrush to a pressure that will not cause unwanted side effects.

BRIEF SUMMARY

Exemplary embodiments according to the present disclosure are directed to an oral care system including an oral care device and a processor. The oral care device includes a head having cleaning elements and a vibrational sensor configured to determine vibrational data emitted by the oral care device in use. The processor is operably coupled to the vibrational sensor and is configured to: determine, based on the vibrational data, an applied pressure of the cleaning elements upon an oral cavity of a user; determine an optimal pressure associated with the oral cavity of the user and a non-optimal pressure associated with the oral cavity of the user; and based on the applied pressure of the cleaning elements upon the oral cavity being substantially the non-optimal pressure, cause the applied pressure of the cleaning elements upon the oral cavity to be substantially the optimum pressure.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The foregoing summary, as well as the following detailed description of the exemplary embodiments, will be better understood when read in conjunction with the appended drawings. It should be understood, however, that the invention is not limited to the precise arrangements and instrumentalities shown in the following figures.

DETAILED DESCRIPTION

Figure 1:
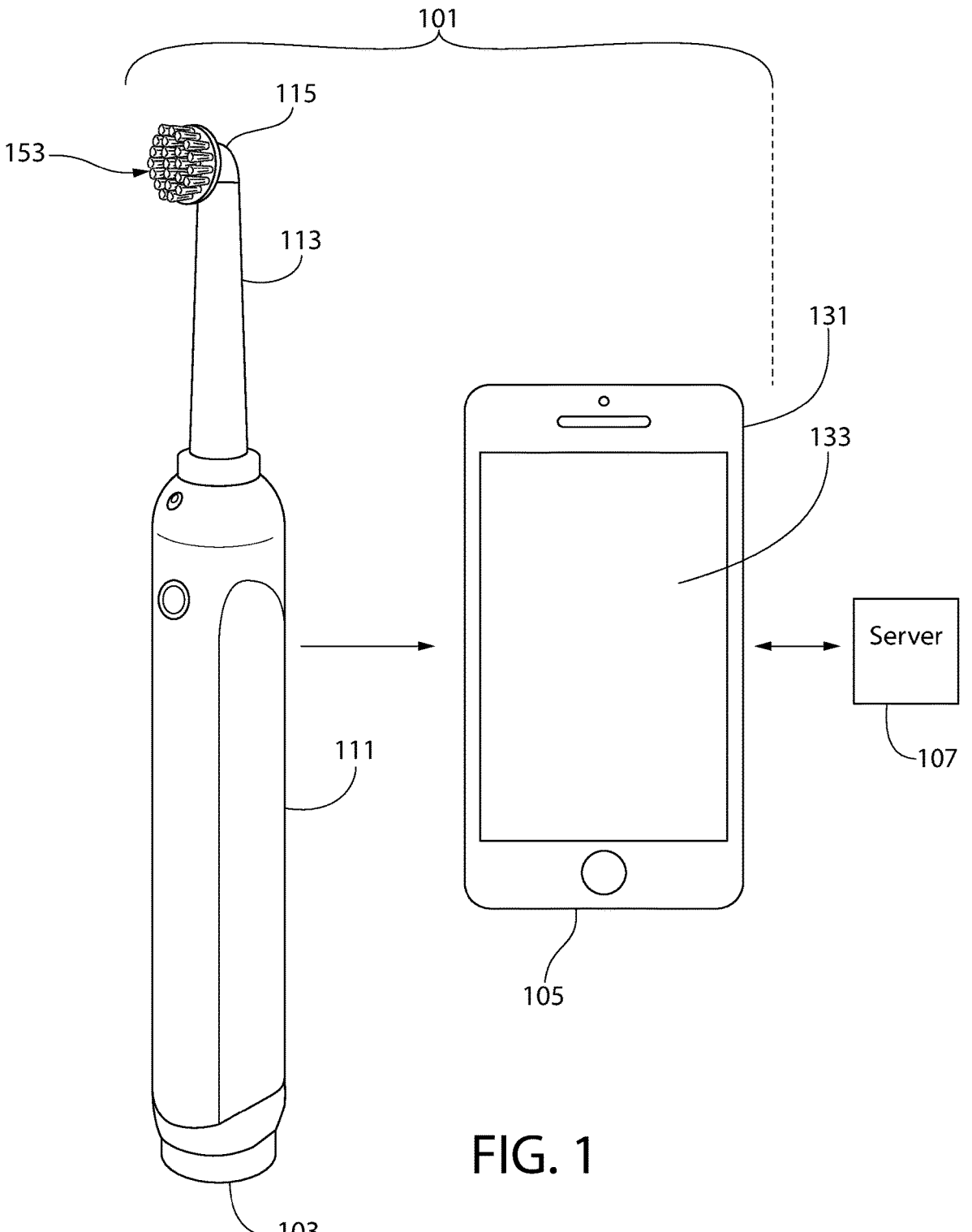
FIG. 1 is a schematic view of an example oral care system, as described herein.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "left," "right," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such.

Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combinations of features that may exist alone or in other combinations of features; the scope of the invention being defined by the claims appended hereto.

Features of the present invention may be implemented in software, hardware, firmware, or combinations thereof. The programmable processes described herein are not limited to any particular embodiment, and may be implemented in an operating system, application program, foreground or background processes, driver, or any combination thereof. The computer programmable processes may be executed on a single processor or on or across multiple processors.

Processors described herein may be any central processing unit (CPU), specialized processing unit (e.g., a graphics processing unit) microprocessor, micro-controller, computational, or programmable device or circuit configured for executing computer program instructions (e.g. code). Various processors may be embodied in computer and/or server hardware of any suitable type (e.g. desktop, laptop, notebook, tablets, cellular phones, etc.) and may include all the usual ancillary components necessary to form a functional data processing device including without limitation a bus, software and data storage such as volatile and non-volatile memory, input/output devices, graphical user interfaces (GUIs), speakers, microphones, removable data storage, and wired and/or wireless communication interface devices including Wi-Fi, Bluetooth, LAN, etc.

Computer-executable instructions or programs (e.g. software or code) and data described herein may be programmed into and tangibly embodied in a non-transitory computer-readable medium that is accessible to and retrievable by a respective processor as described herein which configures and directs the processor to perform the desired functions and processes by executing the instructions encoded in the medium.

A device embodying a programmable processor configured to such non-transitory computer-executable instructions or programs is referred to hereinafter as a "programmable device", or just a "device" for short, and multiple programmable devices in mutual communication is referred to as a "programmable system". It should be noted that non-transitory "computer-readable medium" as described herein may include, without limitation, any suitable volatile or non-volatile memory including random access memory (RAM) and various types thereof, read-only memory (ROM) and various types thereof, flash memory, and magnetic or optical data storage devices (e.g. internal/external hard disks, floppy discs, magnetic tape CD-ROM, DVD-ROM, optical disk, ZIP™ drive, Blu-ray disk, and others), which may be written to and/or read by a processor operably connected to the medium.

In certain embodiments, the present invention may be embodied in the form of computer-implemented processes and apparatuses such as processor-based data processing and communication systems or computer systems for practicing those processes. The present invention may also be embodied in the form of software or computer program code embodied in a non-transitory computer-readable storage medium, which when loaded into and executed by the data processing and communications systems or computer systems, the computer program code segments configure the processor to create specific logic circuits configured for implementing the processes.

Where ranges are disclosed herein, such ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Turning in detail to the drawings, FIG. 1 illustrates an oral care system 101 in accordance with an embodiment of the present invention. The oral care system 101 includes an oral care device 103 and an optional programmable device 105. In examples including programmable device 105, the programmable device 105 may communicate with a server 107 for purposes of storing data and/or to provide server-side processing functionality. The presence of the server 107 and communication between the programmable device 105 and the server 107 are not limiting of the present invention unless specifically set forth in a claim. Each of the oral care device 103, the programmable device 105, and the server 107 may include a programmable processor, and each of the respective programmable processors may perform one or more of the processes described herein.

Where a process is described as being performed by the programmable processor of the programmable device 105, the process may be performed by the programmable processor of the server 107 or part of the process may be performed by the programmable processor of the programmable device 105 and part of the process may be performed by the programmable processor of the server 107. Where a process is described as being performed by the programmable processor of the oral care device 103, that process may also be performed, in all or in part, by the programmable processor of the programmable device 105 and/or by the programmable processor of the server 107. Allocation of which programmable processor performs which part of a process may be determined by the particular implementation of the oral care system 101 and may not be limiting of the invention unless otherwise expressly stated in a claim.

The oral care device 103 may include a handle 111, a neck 113, a head 115, and cleaning elements 153 (e.g., bristles). The neck 113 extends between the handle 111 and the head 115 and connects the head 115 to the handle 111. The handle 111 provides the user with a mechanism by which the toothbrush 103 can be readily gripped and manipulated during a brushing routine. The handle 111 may be formed of many different shapes, sizes and materials and may be formed by a variety of manufacturing methods that are well-known to those skilled in the art. The handle 111 has a generally elongate shape, along a longitudinal axis and transitions into the neck 113 at one end thereof. While the neck 113 generally has a smaller transverse cross-sectional area than the handle 111, the invention is not so limited. The neck 113 may form a transition region between the handle 111 and the head 115. While the head 115 is normally widened relative to the neck 113, in some embodiments the head 115 can be a continuous extension or narrowing of the neck 113 and/or handle 111. In embodiments, one or more of the handle 111, the head 115, and/or the neck 113 may have different shapes, sizes, orientations, and/or the like. The invention is not to be limited by the size and/or shape of any portion of the oral care device 103 unless otherwise indicated in a claim. Additional features may be incorporated into the toothbrush or disposed on the toothbrush. In an embodiment, the head 115, including at least part of the neck 113, of the oral care device 103 are detachable from the handle 111, such that the head 115 is replaceable with another head 115. Whether the handle 111, the neck 113, and the head 115 are of a unitary or multi-piece construction (including connection techniques) is not limiting of the present invention, unless specifically set forth in a claim.

The programmable device 105 includes a housing 131 and a display 133. The housing 131 encloses other various components of the programmable device 105, including one or more processors (e.g., programmable processors). Other components of the programmable device 105 may include a power source (such as a battery), a memory, a communication subsystem (to enable wireless and/or wired communications with other programmable devices), an imaging subsystem (such as a camera), and the like. The memory may be any appropriate type of memory or storage which enables the programmable processor to perform the functions as described herein. By way of example, the memory may be volatile and/or non-volatile random access memory. Unless specifically set forth in a claim, the components of the programmable device 105 are not to be limiting of the invention.

The display 133 may be any type of light emitting display, and as shown in the exemplary embodiment, the display 133 may be an LED panel. In certain other embodiments, the display 133 may be an LCD panel, an OLED panel, or any other type of display which is electronically controllable by the programmable processor of the programmable device 105. In certain embodiments, the display 133 may be a touch sensitive display which accepts input from the user directly on the display surface. Such a touch sensitive display 133 may therefore serve as a user interface for the programmable device 105. The type and configuration of the display 133 is not limiting of the invention unless specifically set forth in a claim. Similarly, the type and configuration of the user interface is not limiting of the invention unless specifically set forth in a claim.

Figure 2:
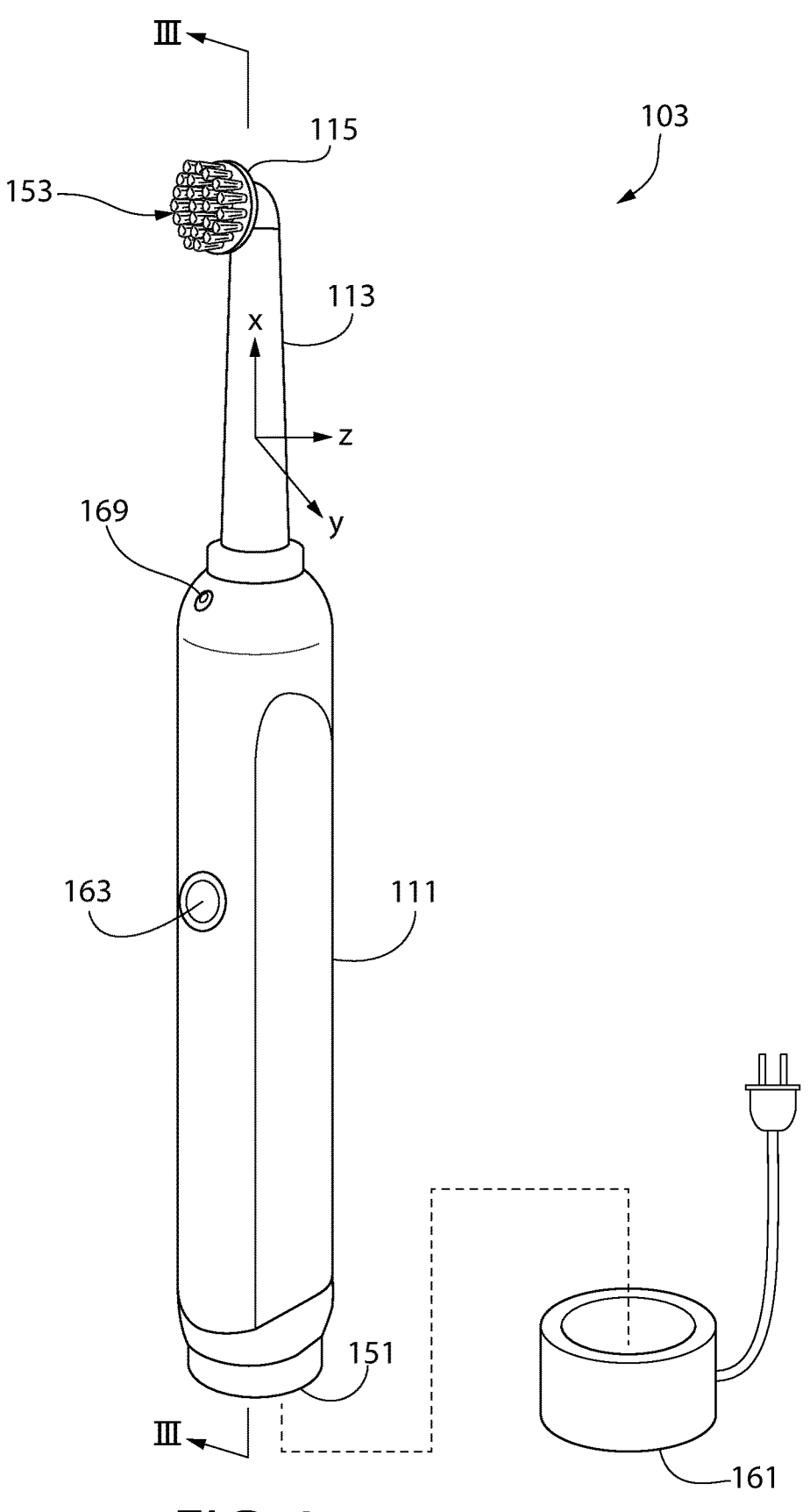
FIG. 2 is a perspective view of an example oral care device for use with the oral care system of FIG. 1.
Figure 3:
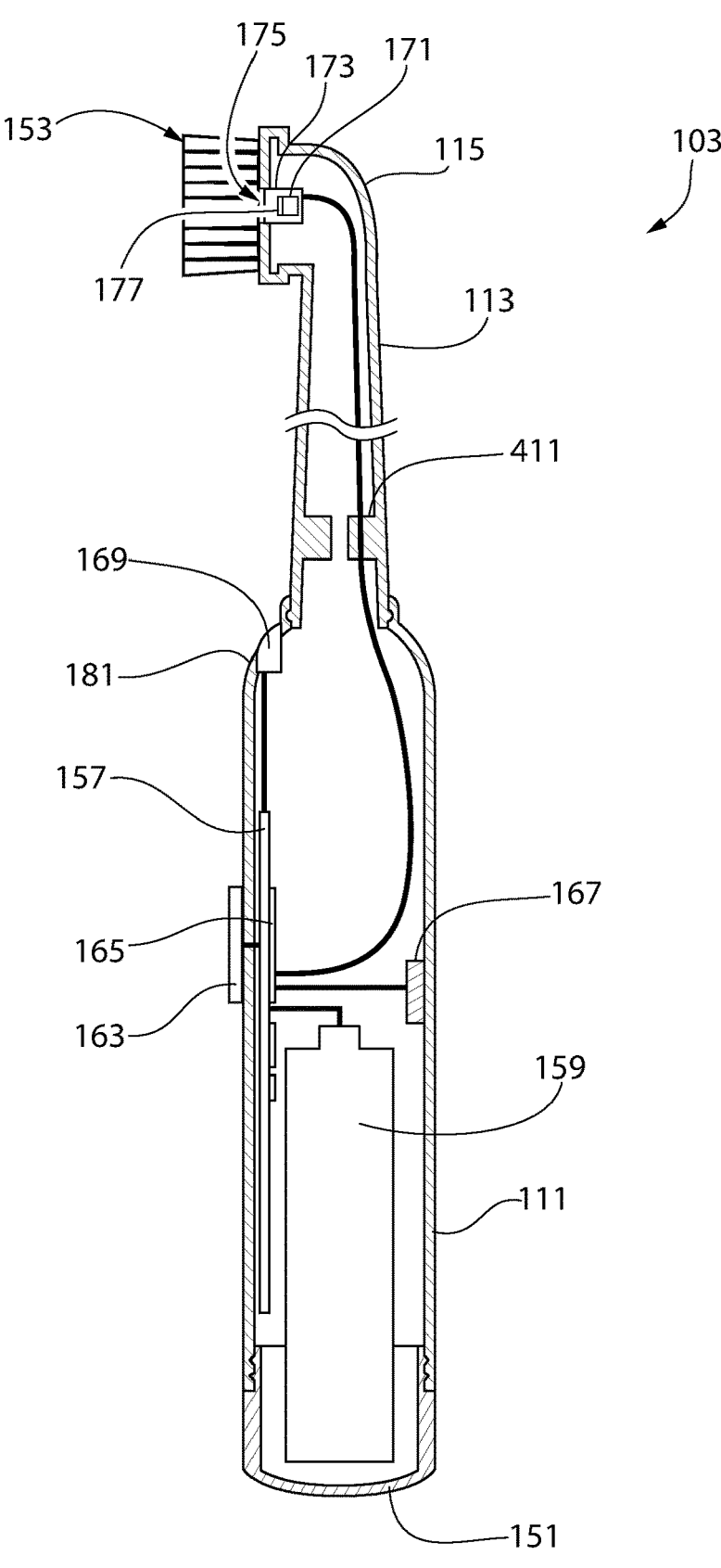
FIG. 3 is a cross-sectional view of the example oral care device of FIG. 2 taken along the section line 3-3.

FIGS. 2-3 illustrate an example of an oral care device 103, shown as a toothbrush for an oral cavity. The head 115 of the oral care device 103 includes teeth cleaning elements 153, such as bristles. Oral care device 103 includes a circuit board 157 enclosed within the handle 111. The circuit board 157 and other electronic components of the oral care device 103 may be powered by a rechargeable battery 159, which may be enclosed within the handle 111. The rechargeable battery 159 may be recharged by setting the end of the oral care device 103 in the receptacle of the recharging base unit 161 in order to recharge the rechargeable battery 159 through inductive charging. In embodiments, oral care device 103 may include a disposable battery instead of the rechargeable battery 159. The type of power source used to provide power to the electronic components of oral care device 103 is not to be limiting of the invention unless otherwise expressly stated in a claim. A power button 163 is operatively coupled to the circuit board 157 so that a user may control power to the circuit board 157 and other electronic components of the oral care device 103.

Electronic components of the oral care device 103 may include at least one processor (e.g., programmable processor 165) and a plurality of sensors. The electronic components may be operatively coupled to the circuit board 157. The programmable processor 165 may be programmed to process the sensor data. The sensors (e.g., vibrational sensors) included in the oral care device 103 may include one or more micro-electro-mechanical system (MEMS) devices, microphones, interferometers, inertial measurement units (IMU) 167, image sensors 169, and/or optical sensors 171.

A MEMS device 411 (FIGS. 3 and 4) and/or an interferometer may determine (e.g., measure) pressure and/or changes in pressure applied to portions of an oral cavity (such as gums and/or teeth) by the cleaning elements, as described herein. For example, the MEMS device 411 and/or interferometer may measure pressure and/or changes in pressure by detecting amplitude, frequency, and/or phase (e.g., amplitude, frequency, and/or phase changes) in vibrations of the device. Based on the determined pressure and/or changes in pressure applied to portions of the oral cavity, the circuit board 157, programmable processor 165, and the like (e.g., an analog processor) may cause the intensity of the motor (e.g., electric motor, such as vibratory motor 467) of the oral care device 103 to change.

Figure 4:
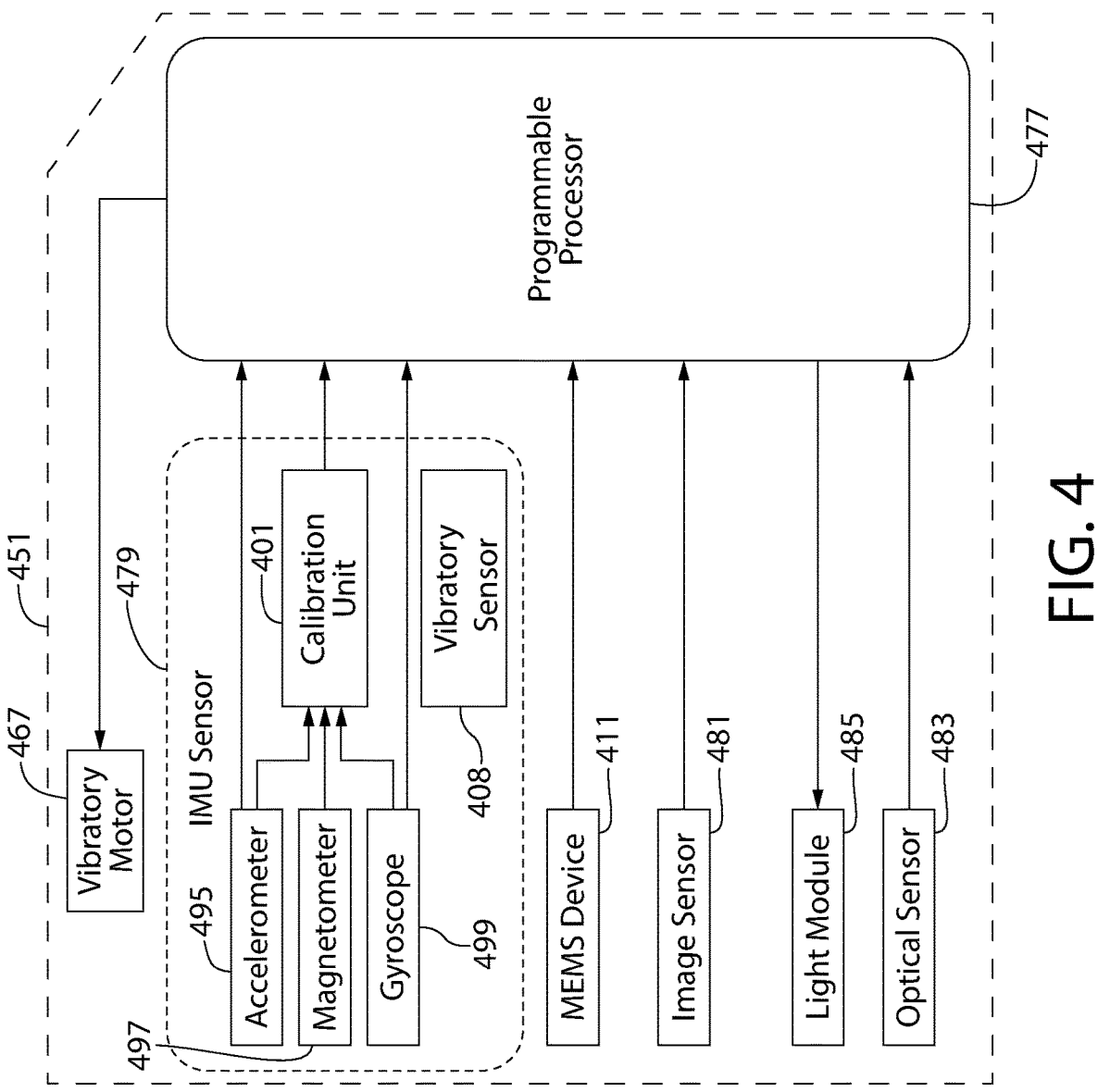
FIG. 4 is a schematic view of operational components of the example oral care device, as described herein.

The motor may be coupled to the circuit board 157 and/or programmable processor 477 (FIG. 4). In an example, a frequency to voltage conversion circuit may adjust (e.g., automatically adjust) pressure without the need of circuit board 157 and/or programmable processor 477. As shown on FIG. 4, oral care device 451 may include vibratory (e.g., vibrational) sensor 408. In examples the vibrational sensor 408 may be an inertial measurement unit (IMU), a MEMS device (such as a microphone), a miniature microphone, a compact interferometer, a tilt sensor, and the like. Although FIG. 4 shows vibrational sensor 408 within IMU Sensor 479, one or more vibrational sensors 408 may be located within and/or outside IMU Sensor 479. Vibrational sensor 408 may be coupled to circuit board 157 and/or programmable processor 477.

Figure 6:
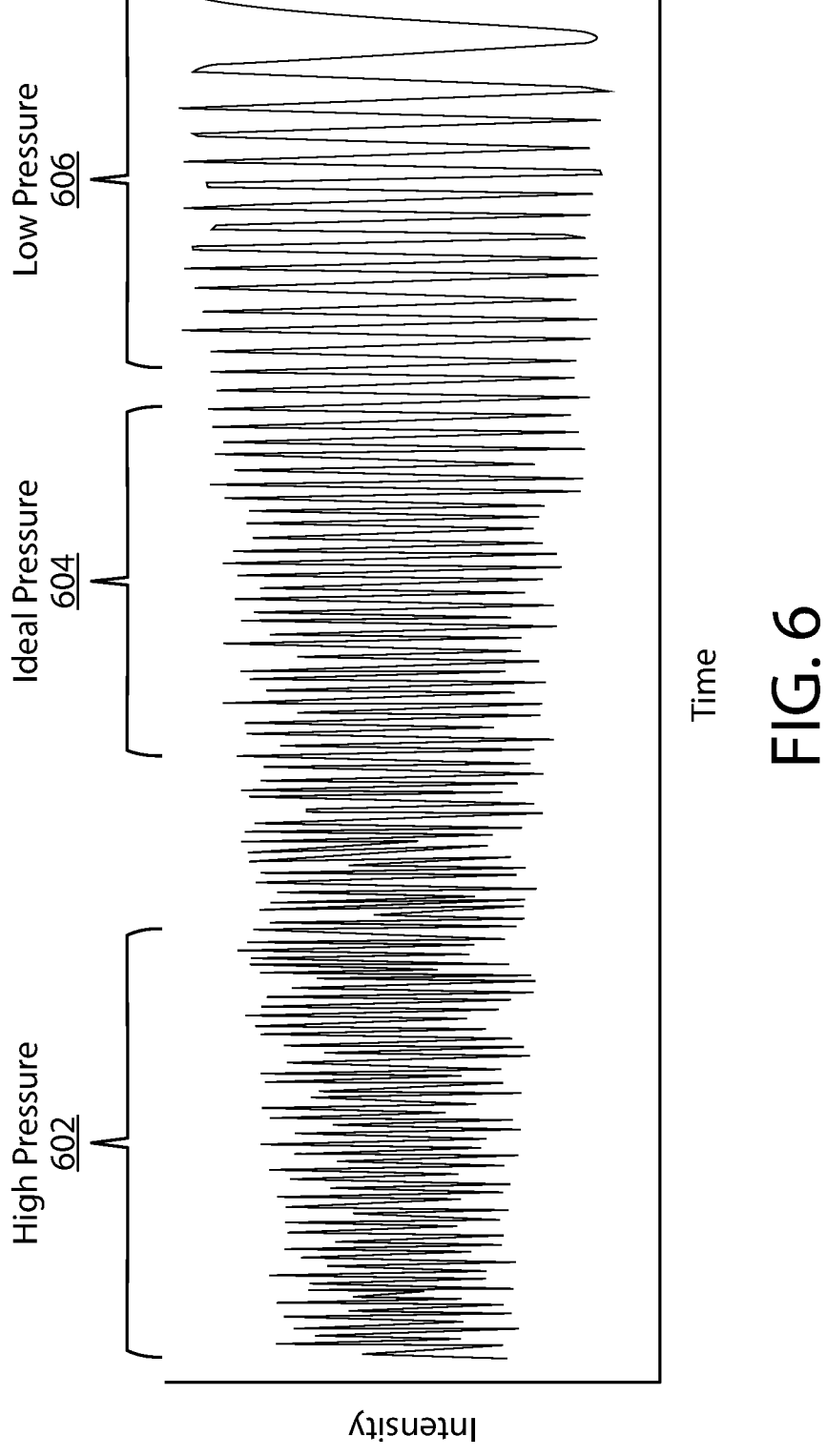
FIG. 6 illustrates example vibrational intensities and frequencies measured from the example oral care system, as described herein.

The circuit board 157 (FIG. 3) and/or programmable processor 477 may sample the sensor (e.g., vibratory sensor 408) at one or more speeds (e.g., at high speeds, such as between 1 nanosecond to 1 second) and measure changes in vibrational intensity. For example, a MEMS microphone may determine (e.g., measure) mechanical vibrations (e.g., direct vibrations) of the oral care device 451. The determination of mechanical vibrations may differ from using a conventional microphone which determine air vibrations. The vibrational intensity may be related to the pressure applied by the brush head of the cleaning device. FIG. 6 shows example raw data measured from the MEMS device on an example oral care device demonstrating different vibrational intensities and frequencies with different pressures. In particular, FIG. 6 shows example vibrational intensities indicating high pressure 602, ideal pressure 604, and low pressure 606.

The circuit board 157 and/or programmable processor 477 may determine optimal and/or non-optimal pressures that may be applied to a user via an oral care device. The pressure to be applied by the oral care device may be pre-set to maintain a predetermined optimal pressure. In examples in which the pressure is not optimal, the circuit board 157 and/or programmable processor 477 may cause the motor intensity to change (e.g., change in real-time) to maintain an optimal brushing pressure. For example, the maintaining of the pressure may be performed using one or more techniques, such as using a PID, PI, PD, ID, P, I, or D controller. In another example, the motor intensity may be adjusted (e.g., actively adjusted) via an analog output to control the motor intensity, or a PWM output to the motor may be used to adjust motor intensity.

Values of pressures (e.g., non-optimal, optimal) may be determined via machine learning techniques. For example, a machine learning model may be trained using optimal and non-optimal values. Upon the determination of the pressure being applied within the cavity (e.g., as determined by the MEMS device), machine learning techniques may be used to determine whether the pressure is optimal or non-optimal. If the pressure being applied is determined to be non-optimal, machine learning techniques may be used to determine optimal pressure to be applied. The motor of the oral care device may be adjusted so that the optimal amount of pressure is applied.

Figure 5:
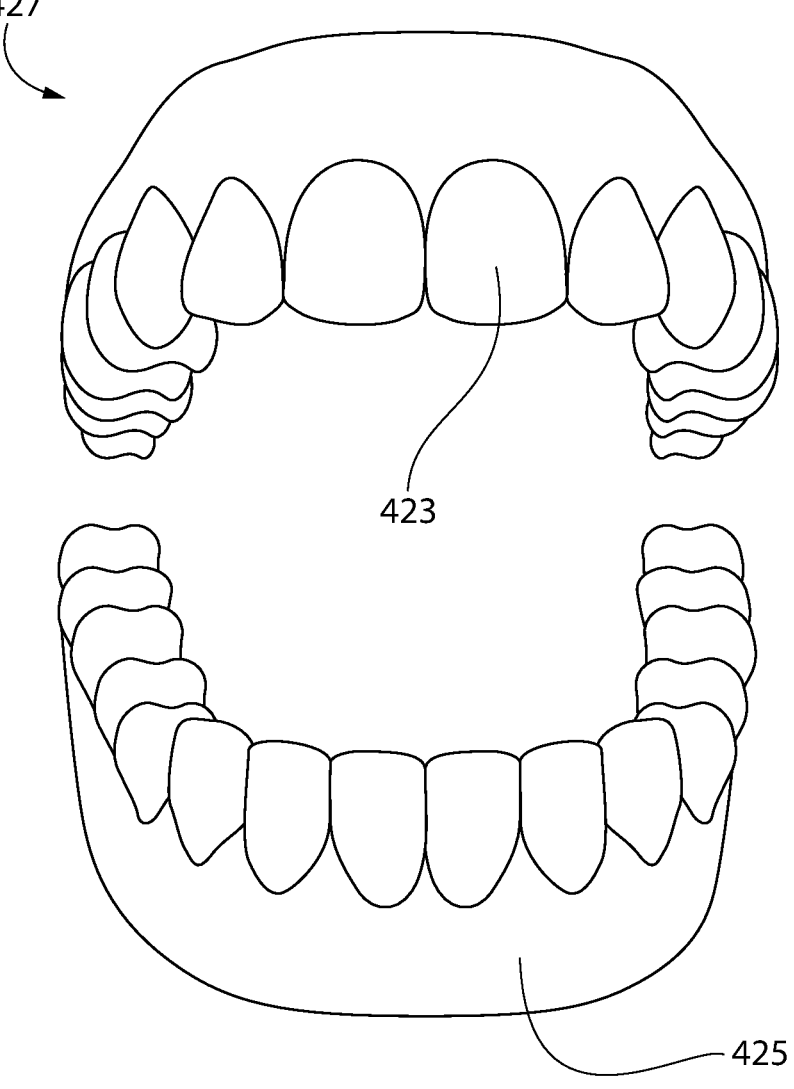
FIG. 5 illustrates an example oral cavity including soft and hard tissue within the cavity, as described herein.

The intensity of the electric motor of the oral care device 103 may be changed so that the vibrations maintain a specific pressure (e.g., a pressure that mitigates or prevents damage to hard and soft tissues in the oral cavity). The pressure may be associated with a zone within an oral cavity. FIG. 5 shows an example oral cavity 427 that includes hard tissue 423 (e.g., teeth) and soft tissue 425 (e.g., gums). Zones within the oral cavity 500 may include a top zone, a bottom zone, a back zone, a front zone, or a combination thereto. The motor of the oral care device 103 may be reduced to a level resulting in the pressure applied by the cleaning elements being a safe level (e.g., a pressure level that will reduce or prevent recession of gums that may occur when the pressure is above a desired level). For example, the motor of the oral care device 103 may be reduced to a level resulting in the pressure applied by the cleaning elements in a particular zone (e.g., top front) being a safe level.

The IMU (e.g., IMU 167) may be a micro-electro-mechanical system (MEMS), which may include an accelerometer, a gyroscope, and a magnetometer. The IMU 167 may be a Hall Effect sensor (e.g., a built in hall effect sensor). The Hall Effect sensor may determine (e.g., measure) the variations of the magnetic field induced by the motor of the oral care device. The variations of the magnetic field may be related (e.g., proportional) to the applied brushing pressure and/or the motor torque.

The IMU 167 may be included within and coupled to the handle 111 of the oral care device 103. The IMU 167 may be included within and coupled to the neck 113 or the head 115, without losing functionality, even though the manner in which the sensor data from the IMU 167 is processed may need to be changed in order to maintain the same functionality. The manner in which the IMU 167 is coupled to the oral care device 103, and the location at which it is coupled, is not to be limiting of the invention unless otherwise expressly stated in a claim. The IMU 167 generates sensor data in the form of 3-axis linear acceleration data, 3-axis orientation data, and 3-axis magnetometer data. Certain embodiments of the IMU 167 may generate additional types of sensor data. The linear acceleration data, orientation data, and magnetometer data from the IMU 167 are further processed by the oral care system 101, as part of the sensor data.

IMU data may be used with information provided by the vibratory sensor to determine the pressure being applied to portions within the oral cavity. For example, accelerometer, gyroscope, and/or magnetometer information may be used with vibration information determined by the vibratory sensor to determine the pressure being applied to portions within the oral cavity. As an example, IMU data may be used to determine the speed at which the cleaning elements are moving, the angle at which the cleaning elements are applying pressure to portions within the oral cavity, and the like. Such IMU information may be combined with the vibration information to determine the pressure that is applied to portions within the oral cavity. Additionally, or alternatively, the current draw of the motor of the oral care device may be combined with IMU data and/or vibration information to determine the pressure that is applied to portions within the oral cavity.

The pressure applied to portions within the oral cavity may be based on one or more physical attributes of portions of the oral care device, such as the area of the cleaning elements that contacts portions of the oral cavity, the size of the head, and the like. For example, pressure applied to portions within the oral cavity may be based on the size and/or shape of the head (e.g., area of the cleaning elements configured to contact one or more portions of the oral cavity) of the oral care device. The pressure applied to portions within the oral cavity may be based on the type of materials used for the cleaning elements (e.g., soft, medium, hard materials), the lengths of the cleaning elements, the length in which the cleaning elements extend from the head of the oral care device, and the like. The pressure applied to portions within the oral cavity may be based on the length of the neck of the oral care device, the weight of the oral care device, etc.

The image sensor 169 may be configured as a camera which has its objective lens facing in the direction of cleaning elements 153 of the head 115. The image sensor 169 is operatively coupled to the circuit board 157 so that the image sensor 169 may be controlled by the programmable processor 165. The image sensor 169 is mechanically coupled to the interior of the handle 111, and the handle 111 includes an opening 181 through which the image sensor 169 can capture images of the side of the head 115 having the cleaning elements 153 when the oral care device 103 is not in use. When the oral care device 103 is in use during an oral care routine, the image sensor 169 is able to capture images of the user's mouth. Such images may also include portions of the user's face around the mouth. In the exemplary embodiment, the image sensor 169 may have a fixed focal length that is set at a point between a mid-point of the head 115 and the opening 181 in the handle 111. In such embodiments, the image sensor 169 does not need to spend any time adjusting focus to accommodate different depths of images. The image sensor 169 generates sensor data in the form of image data.

The optical sensor 171 is located within the head 115 of the oral care device 103 and is operatively to the circuit board 157 so that the optical sensor 171 may be controlled by the programmable processor 165 and provide data to the programmable processor 165. In this exemplary embodiment, the optical sensor 171 is located within, and is operated in conjunction with, the light module 173. In certain embodiments, the optical sensor 171 may be located elsewhere within the handle 111, the neck 113, or the head 115 of the oral care device 103, such that it remains operatively coupled to the circuit board 157.

The light module 173 serves as a light emitter and a light collector and is positioned so that light emitted from the light module 173 is directed through an optical aperture 175 formed as a translucent optical window in the head 115. Similarly, optical feedback may enter the head 115 through the optical aperture 175 to be collected by the optical sensor 171 within the light module 173. During operation of the oral care device 103, the light entering the light module 173 is optical feedback, which is light that is reflected and/or fluoresced by the organic matter in response to being illuminated with light emitted from the light module 173. Such organic matter may be soft oral tissue, hard oral tissue, plaque, biofilms, and many other types of organic matter that may typically be found within a user's oral cavity.

The light module 173 includes a light source, such as a plurality of LEDs, for emission of light in one or more wavebands selected as being suitable to generate the desired optical feedback through interaction with organic matter within the oral cavity of the user during an oral care routine. The light module 173 is operatively coupled to the circuit board 157 so that the emission of light from the light module 173 may be controlled by the programmable processor 165. In certain embodiments, light from one or more LEDs may be directed to the light module 173 through a light guide. The optical sensor 171 may be a CCD, CMOS, or other type of electronic image capturing device with sufficient pixel resolution to capture images within the oral cavity of the user using the optical feedback received during an oral care routine. The optical sensor data may thus be used to generate still images or a video of oral tissue within the oral cavity.

FIG. 4 illustrates the flow of data and control signals when using the oral care device 451 as part of the oral care system 101 of FIG. 1. The data flow shown includes raw sensor data from the plurality of sensors, transformed sensor data, and feedback provided both to the user and to other components of the oral care system 101. As previously indicated, the programmable processor 477 is operatively coupled to each of the IMU 479, the MEMS device 411 (e.g., a MEMS microphone), the image sensor 481, the optical sensor 483, the light module 485, and/or the microphone 413 of the oral care device 451. For example, MEMS microphone may determine (e.g., measure) mechanical vibrations (e.g., direct vibrations). The determination of mechanical vibrations differs from using a conventional microphone to determine air vibrations.

As described herein, the IMU 479 may include a vibratory sensor 408, a 3-axis accelerometer 495, a 3-axis magnetometer 497, a 3-axis gyroscope 499, and an internal calibration unit 498. In certain embodiments, the IMU 479 may include a wireless communication module which may be used to enable direct wireless communications with one or more external devices, such as programmable device 105 and/or server 107 (FIG. 1). The accelerometer 495 generates 3-axis linear acceleration data based in x, y, z coordinates, and that linear acceleration data is directed both to the calibration unit 401 and to the programmable processor 477. The magnetometer 497 generates 3-axis magnetic direction data, and that magnetic direction data is directed to the calibration unit 401. The gyroscope 499 generates 3-axis orientation data based in x, y, z coordinates, and that orientation data is directed both to the calibration unit 401 and to the programmable processor 477. The calibration unit 401 orients sensor data from the accelerometer 495 and the gyroscope 499, using sensor data from the magnetometer 497, so that the sensor data from both are aligned with the device coordinate system.

The optical sensor 483 generates optical sensor data, and that optical sensor data is directed to the programmable processor 477. In an embodiment, the optical sensor data represents optical feedback resulting from light from the light module 485 being incident on organic matter within the oral cavity of the user. When light from the light module 485 is incident on organic matter, the optical feedback may be one of reflected light or fluoresced light. In embodiments, the optical sensor 483 may be positioned with the head 457 and receive the optical feedback through a light scattering element having a known scatter pattern, such as a diffuser, a patterned mask, or an array of microlenses. In such embodiments, the optical sensor data may include 3-dimensional topographical image data, which is also generated from the optical feedback.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. An oral care system comprising:

an oral care device comprising:

a head comprising cleaning elements; and a vibrational sensor configured to determine vibrational data emitted by the oral care device in use, the vibrational sensor comprising a microelectromechanical systems (MEMS) device configured to directly measure a mechanical vibration to determine the vibrational data; and at least one processor operably coupled to the vibrational sensor, the at least one processor configured to: determine, based on the vibrational data, an applied pressure of the cleaning elements for respective zones of a plurality of zones within an oral cavity of a user; determine, for each zone, an optimal pressure and a non-optimal pressure associated with the zone; and based on the applied pressure for a given zone being substantially the non-optimal pressure, cause the applied pressure for that zone to be substantially the optimal pressure by adjusting a motor intensity of the oral care device;

wherein at least one zone of the plurality of zones has a different optimal pressure and non-optimal pressure than another of the plurality of zones;

wherein the MEMS device is a microphone configured to determine a mechanical vibration emitted by the oral care device.

2. The oral care system according to claim 1, wherein the vibrational data comprises an amplitude, frequency, or phase associated with vibrations of the oral care device.

3. The oral care system according to claim 1, wherein the applied pressure of the oral care device to the oral cavity is further based on a contact area of the cleaning elements.

4. The oral care system according to claim 1, wherein the pressure to be applied to the oral cavity of the user of the oral care device is further based on a material type of the cleaning elements.

5. The oral care system according to claim 1, wherein the processor is configured to determine the optimal pressure and the non-optimal pressure via machine learning techniques.

6. The oral care system according to claim 1, wherein the head further comprises an optical aperture that is flush with a front surface of the head and a light module located with the head operably connected to the processor, the light module configured to emit light and receive optical feedback through the optical aperture.

7. The oral care system according to claim 6, wherein the light module comprises an optical sensor that receives the optical feedback, and the optical feedback is indicative of light that is fluoresced by organic matter in response to the light emitted by the light module.

8. The oral care system according to claim 1, wherein the oral care device further comprises a neck coupled to the head, the vibrational sensor coupled to and located within the neck.

9. A method for determining a pressure applied via an oral care device, the method comprising:

determining, via a vibrational sensor, vibrational data emitted by the oral care device in use;

determining, based on the vibrational data, an applied pressure of the oral care device for respective zones of a plurality of zones within an oral cavity of a user;

determining, for each zone, an optimal pressure and a non-optimal pressure associated with the zone; and based on the applied pressure for a given zone being substantially the non-optimal pressure, causing the applied pressure for that zone to be substantially the optimal pressure by adjusting a motor intensity of the oral care device;

wherein the vibration sensor comprises a microelectro-mechanical systems (MEMS) device configured to directly measure a mechanical vibration to determine the vibrational data, the MEMS device being a microphone configured to determine the mechanical vibration emitted by the oral care device;

wherein at least one zone of the plurality of zones has a different optimal pressure and non-optimal pressure than another of the plurality of zones.

10. The method according to claim 9, wherein the applied pressure of the oral care device to the oral cavity is further based on a contact area of the cleaning elements.

11. The method according to claim 9, wherein the pressure to be applied to the oral cavity of the user of the oral care device is further based on a material type of the cleaning elements.

12. An oral care system comprising:

an oral care device comprising:

a head comprising cleaning elements; and a vibrational sensor configured to determine vibrational data emitted by the oral care device in use, the vibrational sensor comprises a microelectromechanical systems (MEMS) device configured to directly measure a mechanical vibration to determine the vibrational data and an inertial measurement unit (IMU), the MEMS device being a microphone configured to determine a mechanical vibration emitted by the oral care device; and at least one processor operably coupled to the vibrational sensor, the at least one processor configured to: determine, based on the vibrational data, an applied pressure of the cleaning elements for respective zones of a plurality of zones within an oral cavity of a user; determine, for each zone, an optimal pressure and a non-optimal pressure associated with the zone; and based on the applied pressure for a given zone being substantially the non-optimal pressure, cause the applied pressure for that zone to be substantially the optimal pressure by adjusting a motor intensity of the oral care device;

wherein the processor is configured to determine the optimal pressure and the non-optimal pressure via machine learning techniques.

13. The oral care system according to claim 12, wherein the IMU is configured to determine IMU data comprising at least one of acceleration data, gyroscope data, or magnetometer data associated with the oral care device, the determination of the applied pressure of the cleaning elements upon the oral cavity being further based on the IMU data.

14. The method according to claim 9, wherein the vibrational data comprises an amplitude, frequency, or phase associated with vibrations of the oral care device.

* * * * *